June 30, 1959  E. M. O'CONOR HONEY  2,892,247
PROCESS AND APPARATUS FOR MAKING ELECTRIC BATTERIES
Filed March 5, 1956  2 Sheets-Sheet 1

Inventor
E. M. O'C. Honey
By Glascott Downing Iseboll
Attys.

United States Patent Office
2,892,247
Patented June 30, 1959

2,892,247

PROCESS AND APPARATUS FOR MAKING ELECTRIC BATTERIES

Eric Maurice O'Conor Honey, Chigwell, England, assignor to The Chloride Electrical Storage Company Limited, London, England, a British company Application March 5, 1956, Serial No. 569,557

6 Claims. (Cl. 29—155.5)

For certain uses it is convenient to absorb or immobilise the electrolyte of primary or secondary electric batteries to avoid spillage if a cell should be overturned. Some loss of performance occurs as a result of the interference with free diffusion of the electrolyte but is allowable in view of the advantage of avoiding loss by spillage. In some primary cells, starch paste is mixed with the electrolyte for this purpose, but this cannot be done with lead-acid secondary cells because of the hydrolysis of starch by acid. Lead acid cells can have their dilute sulphuric acid electrolyte immobilised by the addition of sodium silicate, whereby a "jelly-electrolyte" is obtained, but the jelly tends to break up in service, releasing a certain amount of "free" electrolyte which is subject to spillage.

Glass wool may be rammed into the spaces between and around the plates of secondary cells to act as an absorbent for the electrolyte, but does not act as a very efficient retainer because the electrolyte tends to drain away if the cell is inverted. It is better to use a powder such as diatomaceous earth, which consists of a fine silica powder each particle of which is microporous. If the electrolyte space is tightly filled with diatomaceous earth, the electrolyte is firmly retained within the micropores of the diatomaceous earth particles and in the spaces between the particles, to the extent that little if any drainage occurs if the cell is inverted. Diffusion, although somewhat impaired by comparison with free electrolyte conditions, is reasonably satisfactory while gases given off during charge can make their way to the top of the cell. If the whole volume occupied by the electrolyte is tightly filled with diatomaceous earth, there is no opportunity for active material to become dislodged and no short circuit can occur. On the other hand, if at any place there is a cavity or fault in the diatomaceous earth packing, giving locally free electrolyte conditions, dislodged active material can enter there at some time in the life of the battery and may cause a short circuit because the dislodged active material is prevented from falling away into the space below the plates. It would thus seem evident that diatomaceous earth packing can assist the retention of active material by the plates, but is extremely vulnerable to faults leading to battery failure if it is not everywhere tightly packed into the electrolyte space. Loss of water from the electrolyte by evaporation and by electrolysis during charge has to be made good by the occasional addition of water to the cell. The added water gradually percolates into the diatomaceous earth where it mixes with and dilutes the electrolyte, restoring it to its original specific gravity before the loss of water occurred. To define the top surface of the electrolyte and avoid a layer of loosely packed diatomaceous earth there, it is necessary to cover the packed diatomaceous earth with a baffle plate permeable to the gases evolved during charge and to the water added to replace losses. Any slight excess of water which is not absorbed can then be poured off before the cell is put back into service.

My invention consists of an improved apparatus for making a cell having a powder absorbent for the electrolyte such as diatomaceous earth and an improved process for manufacturing the cell particularly in respect to the filling of the electrolyte space with the powder.

In accordance with my invention, I fill the electrolyte space with powder supplied pneumatically to the spaces around the plates of the plate element while enclosed and in an inverted position. Usually the assembly of plates of an electric accumulator are referred to as the plate element. This comprises positive and negative electrodes and plate lugs. The plate lugs which connect the plates together and to the terminals on the outside of the battery are at the top of the plates. Difficulty has been experienced in filling in a powder between the plates for the purpose of absorbing the electrolyte. I invert the plate element in the filling receptacle so that the plate lugs are at the bottom of the filling receptacle beneath the plate element instead of above it. I also provide beneath the plates in the filling receptacle a glass wool screen and a perforated ebonite sheet to prevent powder from passing downwards when the space between the plates is being filled.

The retaining means for the powder may conveniently consist of a perforated ebonite sheet and a sheet of glass wool designed to remain in situ when the cell is put into service and held in position during filling by a perforated metal plate within the container for the plate element in which filling is effected. Such container is of equivalent internal dimensions to those of the normal cell container to which the powder filled element is transferred. The container may be lined on four sides with paper or plastic foil which remains in position to assist the transfer of the powder filled element to the cell container.

Referring to the accompanying explanatory drawings.

Figure 2:
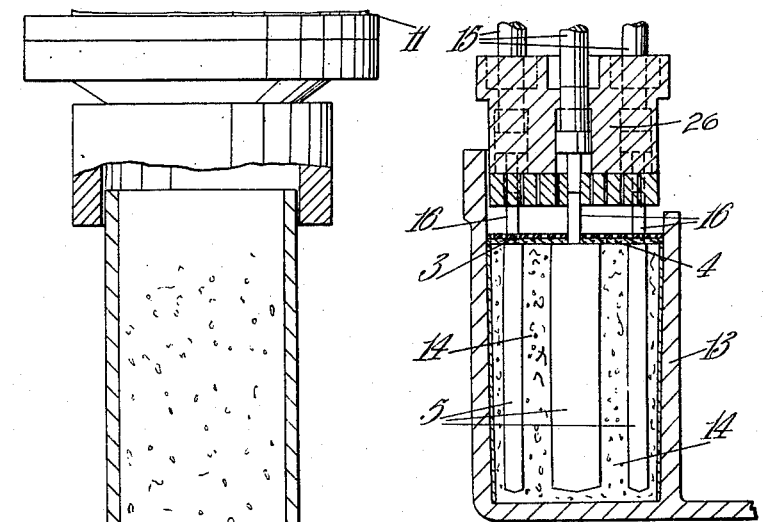
Figure 2 shows the plates in upright position and which have had the spaces between and around them filled and the plate element deposited in a normal cell container.

In one convenient application of the invention, a perforated metal plate 1 is provided with slots to take the plate lugs 16 so that the plates 5 can be located in an upside-down position (i.e., with the lugs beneath the plates) by such means. A perforated ebonite sheet 3 is laid upon the perforated metal plate 1 and above such sheet is placed a sheet of glass wool 4, about 1/16" thick, both the perforated ebonite 3 and the glass wool 4 being provided with slots for the plate lugs. The plates are then put in position in a metal box 6 (which is equivalent in internal dimensions to that of the normal cell container). The metal box is lined on four sides, but not the bottom and top, with paper or plastic foil 7, so that on removing the plate element and the diatomaceous earth packing hereinafter referred to, with the paper or foil therearound from the metal box, they can be transferred and deposited in an upright position in the cell container 13 (Fig. 2). The metal box is put into position beneath a cylinder 8 packed with diatomaceous earth 12. The cylinder has an orifice plate 9 at its base and is fitted with a compressible packing gland 10 to provide an airtight junction with the metal box 6. Compressed air at a pressure preferably in excess of 80 lbs. per square inch is provided from an air cylinder 11 and causes the diatomaceous earth to transfer from the cylinder 8 to the metal box 6, filling all vacant spaces around the plates 5. Air is released and escapes through the glass wool 4 and perforated ebonite baffle 3, but the glass wool 4 prevents the loss of any appreciable amount of diatomaceous earth.

To remove the plate element, the cylinder 8 is raised and the metal box 6 is also raised clear of the plate element and diatomaceous earth packing with the paper or foil 7 therearound. A battery container as 13 Figure 2 is now placed on the inverted powder charged plate element and pressed down. There may be several plate elements in one battery container. The latter, with the plate elements thereon, is turned over through 180° so that the components then assume the positions shown in Figure 2. The perforated metal plate 1 and block 26 are then raised whilst the three-prong stripper 15 is held stationary. In this way the perforated metal plate 1 is caused to disengage from the plate lug 16, thereby leaving the plate element in position within the battery container.

Figure 1:
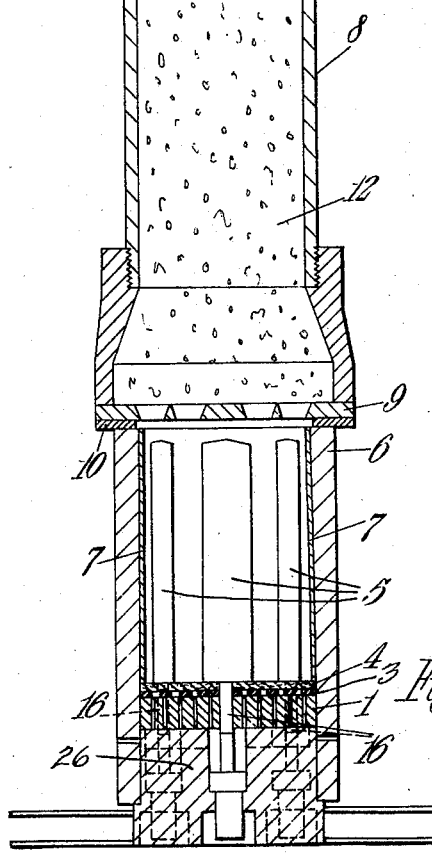
Figure 1 is a diagrammatic sectional view of an equipment for filling the spaces between and around the plates of a secondary electric battery, with the plates in inverted position, constructed in one convenient form in accordance with this invention.

The process is a two-step operation. In the first step, the battery space between the plates are filled with the absorbent powder with the plate element in an upside down position, Fig. 1. In the second step, after the spaces have been filled with powder, the plate element with the surrounding powder and the enclosing lining are removed from the filling device, turned from an upside down position to an upside up position and then deposited in the normal cell container, Fig. 2. In this position, a stripper removes the perforated metal plate, leaving the plate element with the ebonite sheet and glass wool and powder in the battery container ready for filling with electrolyte.

It will be seen that in use the glass wool layer 4 lies upon the top of the diatomaceous earth and is in turn covered by the sheet of perforated ebonite 3. Water added to the battery to replace losses by evaporation and electrolysis can find its way through the composite baffle plate and diffuse into the electrolyte. Gas given off during battery charge passes out through the baffle plate, which serves to prevent any loosening of the top surface of the diatomaceous earth layer as a result of the passage of gas through the electrolyte.

Figure 3:
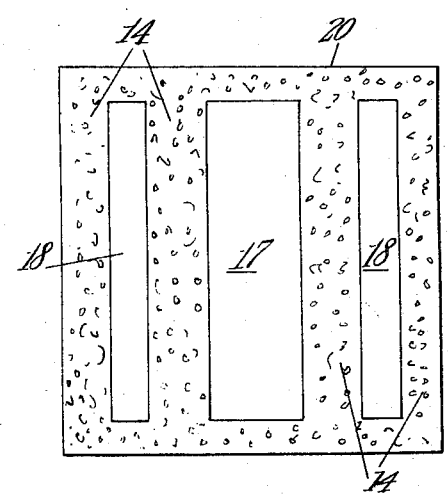
Figure 3 is a diagrammatic sectional plan view of a plate element held in position by means of diatomaceous earth.
Figure 4:
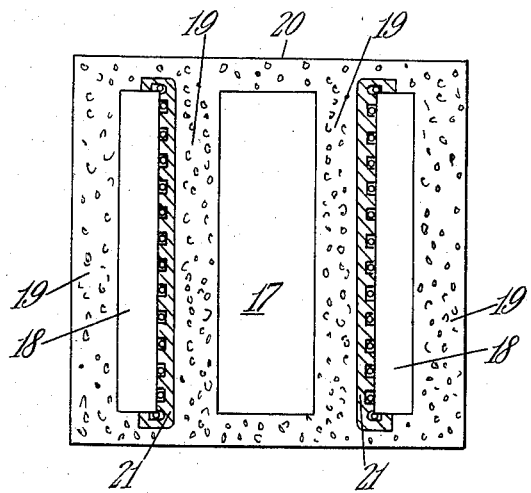
Figure 4 shows a plate element such as illustrated in Figure 3 but with microporous sheet separators in position against the side of each negative plate adjacent to the positive plate, the separators being ribbed where they contact the negative plates.

I have found that the use of air pressure is a convenient means for filling powder into the electrolyte space of cells when carried out as herein described. As shown in Figure 3 the positive plate 17 and the negative plates 18 are held in position within the container 20, by means of the diatomaceous earth 14, which also functions as the absorbent for the electrolyte. Alternately, and as shown in Figure 4, an additional barrier between the plates may be provided by microporous sheet separators 21, preferably finely ribbed on the side adjacent to the negative plates 18.

Figure 5:
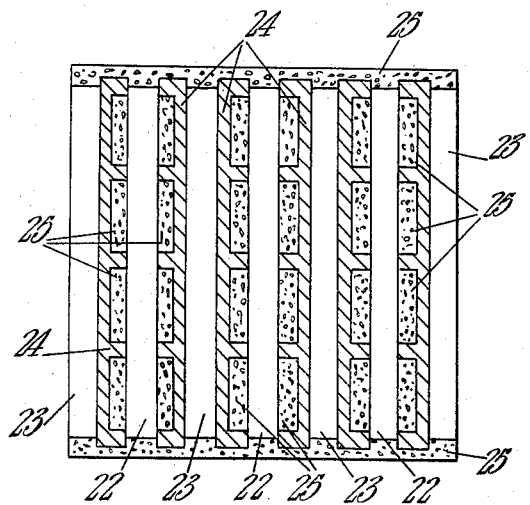
Figure 5 shows an arrangement of cell with a plurality of relatively thin plates therein and with ribbed microporous separators between adjacent plates, the spaces between the ribs of the separators and between the edges of the plates and the cell container being filled with diatomaceous earth.

The constructions so far described are particularly applicable to cells fitted with a few, thick plates. For cells having a multiplicity of thin plates, such as those intended for starting, lighting and ignition of mechanically propelled vehicles, it is usual to provide ribbed microporous separators between adjacent plates of an overall thickness approximately equal to the space between the plates. Such an assembly of plates and separators is a reasonable fit within the container and the separators afford support for the plates. By my process, filling from the base of the element, diatomaceous earth easily flows between the ribs of the separators, if it is desired to occupy the electrolyte space of the cell with an absorbent. In Figure 5 the three positive plates 22 are separated from the four negative plates 23 by the ribbed microporous separators 24. The space that is left within the cell is then filled by diatomaceous earth 25 which occupies the spaces between the ribs of the separators and between the edges of the plates and the container.

What I claim is:

1. A process of filling the electrolyte space of an electric battery with a powder absorbent (such as diatomaceous earth) for the electrolyte, comprising the steps of enclosing the plates of the battery plate element on four sides, inverting such enclosure, covering the normal top of the plate element of the battery with retaining means which is permeable to air and pneumatically supplying diatomaceous earth through the base of the plate element to the spaces between the plates whilst the plate element is enclosed in the enclosure, the latter being then removed from the plate element and a battery container placed on the plate element, the container and plate element being then inverted.

2. A process as claimed in claim 1, in which the plate element whilst having diatomaceous earth supplied to the spaces between the plates is placed within an enclosure lined on four sides with paper or plastic foil which remains in position around the plate element to assist the transfer of the powder filled element to the normal battery container.

3. A process as claimed in claim 1, in which ribbed microporous separators are disposed between the plates and the spaces between the plates and separators are filled with powder.

4. An apparatus for filling the electrolyte space of an electric battery with a powder absorbent surrounding the battery plates that are provided with lugs, comprising a receptacle open at the upper end, a removable liner for the receptacle, a plate in the bottom of the receptacle, a perforated sheet superposed on the plate, a sheet of glass wool superposed on the sheet, the plate, the perforated sheet and the sheet of glass wool being provided with slots to receive the plate lugs with the plates in inverted position, and means for pneumatically supplying the powder to the open end of the receptacle.

5. The process of filling the electrolyte space of an electric battery with a porous powder, comprising forming a transferrable receptacle with an open upper end and a closed bottom, depositing in the receptacle a plate element comprising an assembly of plates upside down, pneumatically feeding the powder tightly packed into the receptacle around the plates of the plate element, inverting the powder packed receptacle, and depositing it in a battery container with the closed bottom uppermost.

6. The process of claim 5, in which the closed bottom is permeable to air.

References Cited in the file of this patent
UNITED STATES PATENTS

| Number | Name | Date |
|---|---|---|
| 1,937,446 | Stampe | Nov. 28, 1933 |
| 2,054,890 | Stampe | Sept. 22, 1936 |
| 2,501,652 | Barrickman | Mar. 28, 1950 |